(12) United States Patent
Lu et al.

(10) Patent No.: US 11,909,653 B2
(45) Date of Patent: Feb. 20, 2024

(54) SELF-LEARNING PACKET FLOW MONITORING IN SOFTWARE-DEFINED NETWORKING ENVIRONMENTS

(71) Applicant: VMware LLC, Palo Alto, CA (US)

(72) Inventors: Mengzhuo Lu, Newark, CA (US); Margaret Petrus, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 500 days.

(21) Appl. No.: 16/744,131

(22) Filed: Jan. 15, 2020

(65) Prior Publication Data

US 2021/0216908 A1 Jul. 15, 2021

(51) Int. Cl.
*H04L 47/2441* (2022.01)
*H04L 43/045* (2022.01)
*G06N 5/01* (2023.01)
*G06N 20/00* (2019.01)

(52) U.S. Cl.
CPC .......... *H04L 47/2441* (2013.01); *G06N 5/01* (2023.01); *H04L 43/045* (2013.01); *G06N 20/00* (2019.01)

(58) Field of Classification Search
CPC ...... G06N 5/003; G06N 20/00; H04L 43/045; H04L 47/2441; H04L 67/1425
See application file for complete search history.

(56) References Cited

U.S. PATENT DOCUMENTS

| | | | | |
|---|---|---|---|---|
| 8,432,919 B2 * | 4/2013 | Seren | ...................... | H04L 43/04 370/395.3 |
| 8,462,786 B2 * | 6/2013 | Liu | ..................... | H04L 45/7453 726/13 |
| 8,682,812 B1 * | 3/2014 | Ranjan | ................ | H04L 63/1425 706/12 |
| 9,800,470 B2 | 10/2017 | Agarwal et al. | | |
| 10,305,809 B2 * | 5/2019 | Stepanek | ............ | H04L 47/2475 |
| 10,348,767 B1 | 7/2019 | Lee et al. | | |
| 10,375,090 B2 * | 8/2019 | McGrew | ............. | H04L 47/2441 |
| 10,498,752 B2 * | 12/2019 | Di Pietro | ............ | H04L 63/1425 |
| 10,530,740 B2 | 1/2020 | Jana | | |
| 10,560,309 B1 | 2/2020 | Chitalia et al. | | |

(Continued)

OTHER PUBLICATIONS

Shou-Chieh Chao et al. "Flow Classification for Software-Defined Data Centers Using Stream Mining", IEEE Transaction on Services Computing, vol. 12, No. 1, Jan./Feb. 2019, 12 pages. (Year: 2019).*

(Continued)

*Primary Examiner* — George C Neurauter, Jr.
(74) *Attorney, Agent, or Firm* — King Intellectual Asset Management (57) ABSTRACT

Example methods and systems for self-learning packet flow monitoring. One example method may comprise monitoring a packet flow to identify attribute information associated with the packet flow between a source and a destination; and classifying the packet flow using a classification engine that is trained using a training dataset to determine a classification output associated with the packet flow. The example method may also comprise providing, to a user device, a user interface (UI) that includes a visualization of the packet flow and the classification output; requesting, via the UI, a feedback associated with the classification output for the packet flow; and updating the classification engine or the training dataset based on the feedback from the user device.

21 Claims, 8 Drawing Sheets

(56) References Cited

U.S. PATENT DOCUMENTS

| | | | |
|---|---|---|---|
| 10,623,285 | B1 | 4/2020 | Shevade et al. |
| 10,673,765 | B2* | 6/2020 | Ma .................... H04L 49/1523 |
| 10,798,015 | B2 | 10/2020 | Rao et al. |
| 10,868,742 | B2 | 12/2020 | Chitalia et al. |
| 10,897,474 | B2* | 1/2021 | Anderson ............... G06N 20/00 |
| 11,018,943 | B1* | 5/2021 | Vasseur .................. H04L 63/20 |
| 11,079,744 | B2 | 8/2021 | Chauvet et al. |
| 11,271,824 | B2* | 3/2022 | Khetarpal ........... H04L 43/0823 |
| 11,271,833 | B2* | 3/2022 | Komarek ........... H04L 63/1458 |
| 2011/0004914 | A1 | 1/2011 | Ennis, Jr. et al. |
| 2014/0215077 | A1 | 7/2014 | Soudan et al. |
| 2014/0280834 | A1 | 9/2014 | Medved et al. |
| 2015/0106670 | A1* | 4/2015 | Gintis ............. G01R 31/31813 714/712 |
| 2016/0219068 | A1* | 7/2016 | Lee ......................... G06N 20/00 |
| 2016/0283859 | A1* | 9/2016 | Fenoglio ................. H04L 43/04 |
| 2016/0359740 | A1* | 12/2016 | Parandehgheibi ...... H04L 47/32 |
| 2016/0378529 | A1* | 12/2016 | Wen .................... G06F 9/45558 718/1 |
| 2017/0295207 | A1* | 10/2017 | Yu ........................... H04L 69/22 |
| 2018/0114126 | A1* | 4/2018 | Das ....................... G06F 16/338 |
| 2018/0123903 | A1 | 5/2018 | Holla et al. |
| 2018/0189677 | A1* | 7/2018 | Anderson ............... G06N 20/00 |
| 2018/0367412 | A1 | 12/2018 | Sethi et al. |
| 2018/0367413 | A1 | 12/2018 | Kompella et al. |
| 2019/0044869 | A1* | 2/2019 | Wang .................. G06F 11/3466 |
| 2019/0044913 | A1* | 2/2019 | Tanida ................ H04L 63/1425 |
| 2019/0190938 | A1* | 6/2019 | Oba ........................ H04L 41/16 |
| 2020/0169484 | A1* | 5/2020 | Cavuto .................. H04L 43/08 |
| 2020/0285737 | A1* | 9/2020 | Kraus ................... G06F 21/552 |
| 2021/0021491 | A1* | 1/2021 | Pasha .................... G06F 11/323 |
| 2021/0067455 | A1* | 3/2021 | Lahtiranta ............. H04L 63/306 |
| 2021/0075799 | A1* | 3/2021 | Pularikkal .............. H04L 45/38 |
| 2021/0204152 | A1* | 7/2021 | Vasudevan .......... H04L 47/2441 |
| 2021/0218630 | A1 | 7/2021 | Lu et al. |
| 2022/0086064 | A1* | 3/2022 | Sivaraman ............ H04L 47/115 |

OTHER PUBLICATIONS

B. Indira et al. "An approach to enhance packet classification performance of software-defined network using deep learning", Soft Computing (2019) 23:8609-8619, 11 pages. (Year: 2019).*

"Application of Machine Learning to Flow-based Network Monitoring", Network Polygraph, Retrieved on Jan. 16, 2020 from the Internet at <URL: https://datatracker.ietf.org/meeting/95/materials/slides-95-nmlrg-1>.

"Intermapper Flows-Reliable NetFlow Monitoring Software Shows You Top Talkers and Listeners for Clear Answers About Traffic Flow", Help System, Retrieved on Jan. 16, 2020 from the Internet at <URL: https://www.helpsystems.com/products/intermapper-flows>.

Alienor, "Virtualization Monitoring: How to Gain Visibility into Your Virtual Environment", Plixer, Retrieved on Jan. 16, 2020 from the Internet at <URL: https://www.plixer.com/blog/network-traffic-analysis/virtualization-monitoring/.

"Analysis of Network Connection Data with Azure Monitor for Virtual Machines", Virtual Machines Blog, Mar. 27, 2019 Retrieved on Jan. 16, 2020 from the Internet at <URL: https://azure.microsoft.com/en-in/blog/analysis-of-network-connection-data-with-azure-monitor-for-virtual-machines/>.

Dirk Wallerstorfer, "Detecting Network Erros and Their Impact on Services", Dynatrace Blog, Dec. 14, 2015, Retrieved on Jan. 16, 2020 from the Internet at <URL: https://www.dynatrace.com/news/blog/detecting-network-errors-impact-on-services/>.

"Troubleshooting a Nonoperational Logical Switch and Corresponding Junos OS OVSDB-Managed VXLAN", Juniper Networks—Techlibrary, Feb. 23, 2018, Retrieved on Jan. 16, 2020 from the Internet at <URL: https://www.juniper.net/documentation/en_US/junos/topics/task/troubleshooting/sdn-ovsdb-non-operational-logical-switch-vxlan.html>.

"Logical Network System Events", VMware NSX Data Center for vSphere 6.4, Last Updated May 31, 2019, Retrieved on Jan. 16, 2020 from the Internet at <URL: https://docs.vmware.com/en/VMware-NSX-Data-Center-for-vSphere/6.4/com.vmware.nsx.logging.doc/GUID-8342573F-797E-4599-947D-CCA3AB794F13.html>.

Non-Published Commonly Owned U.S. Appl. No. 16/744,123, filed Jan. 15, 2020, 31 pages, VMware.

* cited by examiner

| | | | | | | |
|---|---|---|---|---|---|---|
| 511 Source Process | JavaApp1 .exe | JavaApp2 .exe | Nginx.exe | Virtual server process | Virtual server process | iexplore.exe |
| 512 Dest Process | Postgres .exe | Postgres .exe | Virtual server process | JavaApp1 .exe | JavaApp2 .exe | JavaApp1 .exe |
| 513 Source VM | VM1-JavaApp1 | VM2-JavaApp2 | VM3-Reverse | VM4 | VM5 | VM1-JavaApp1 |
| 514 Dest VM | VM6-SQLDB | VM6-SQLDB | Virtual server | VM1-JavaApp1 | VM2-JavaApp2 | VM2-JavaApp2 |
| 515 Source group | APP | APP | WEB | LB | LB | APP |
| 516 Dest group | DB | DB | LB | APP | APP | APP |
| 517 Source Port No | 52101 | 52257 | 52256 | 52200 | 52257 | 52199 |
| 518 Dest Port No | 8080 | 8080 | 80 | 8080 | 8080 | 8080 |
| 519 Protocol | TCP | TCP | TCP | TCP | TCP | TCP |
| 520 No. of events | 1 | 1 | 2 | 1 | 1 | 1 |
| 521 RX Packets | 2342 | 2345 | 1234 | 2365 | 1235 | 1134 |
| 522 TX Packets | 4567 | 2342 | 2356 | 4789 | 2534 | 1678 |
| 523 Latency | 122 | 131 | 132 | 234 | 566 | 344 |
| 530 Past Occurrence Rate | 0.99 | 0.92 | 0.98 | 0.93 | 0.95 | 0.03 |
| 540 Feedback | 1 | 0.98 | 1 | 1 | 1 | 0.2 |
| 550 Has Connection | TRUE | TRUE | TRUE | TRUE | TRUE | FALSE |

SELF-LEARNING PACKET FLOW MONITORING IN SOFTWARE-DEFINED NETWORKING ENVIRONMENTS

CROSS-REFERENCE TO RELATED APPLICATION

The present U.S. patent application Ser. No. 16/744,131 is related in subject matter to U.S. patent application Ser. No. 16/744,123, filed on Jan. 15, 2020, and entitled "LOGICAL NETWORK HEALTH CHECK IN SOFTWARE-DEFINED NETWORKING (SDN) ENVIRONMENTS", which is incorporated herein by reference.

BACKGROUND

Virtualization allows the abstraction and pooling of hardware resources to support virtual machines in a software-defined networking (SDN) environment, such as a software-defined data center (SDDC). For example, through server virtualization, virtual machines running different operating systems may be supported by the same physical machine (also referred to as a "host"). Each virtual machine is generally provisioned with virtual resources to run an operating system and applications. The virtual resources may include central processing unit (CPU) resources, memory resources, storage resources, network resources, etc. Since various network issues may affect traffic among VMs deployed in the SDN environment, it is desirable to perform network troubleshooting and diagnosis to identify those issues.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein. Although the terms "first" and "second" are used throughout the present disclosure to describe various elements, these elements should not be limited by these terms. These terms are used to distinguish one element from another. For example, a first element may be referred to as a second element, and vice versa.

Challenges relating to network troubleshooting and diagnosis will now be explained in more detail using FIG. 1, which is a schematic diagram illustrating example software-defined networking (SDN) environment 100 in which self-learning packet flow monitoring may be performed. Depending on the desired implementation, SDN environment 100 may include additional and/or alternative components than that shown in FIG. 1. SDN environment 100 includes multiple hosts 110A-C that are interconnected via physical network 104. In practice, SDN environment 100 may include any number of hosts (also known as a "host computers", "host devices", "physical servers", "server systems", "transport nodes," etc.), where each host may be supporting tens or hundreds of virtual machines (VMs).

Each host 110A/110B/110C may include suitable hardware 112A/112B/112C and virtualization software (e.g., hypervisor-A 114A, hypervisor-B 114B, hypervisor-C 114C) to support various VMs. For example, hosts 110A-C may support respective VMs 131-136 (see also FIG. 2). Hypervisor 114A/114B/114C maintains a mapping between underlying hardware 112A/112B/112C and virtual resources allocated to respective VMs. Hardware 112A/112B/112C includes suitable physical components, such as central processing unit(s) (CPU(s)) or processor(s) 120A/120B/120C; memory 122A/122B/122C; physical network interface controllers (NICs) 124A/124B/124C; and storage disk(s) 126A/126B/126C, etc.

Virtual resources are allocated to respective VMs 131-136 to support a guest operating system (OS) and application(s). For example, VMs 131-136 support respective applications 141-146 (see "APP1" to "APP6"). The virtual resources may include virtual CPU, guest physical memory, virtual disk, virtual network interface controller (VNIC), etc. Hardware resources may be emulated using virtual machine monitors (VMMs). For example in FIG. 1, VNICs 151-156 are virtual network adapters for VMs 131-136, respectively, and are emulated by corresponding VMMs (not shown for simplicity) instantiated by their respective hypervisor at respective host-A 110A, host-B 110B and host-C 110C. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-2" may refer generally to a link layer or media access control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hypervisor 114A/114B/114C implements virtual switch 115A/115B/115C and logical distributed router (DR) instance 117A/117B/117C to handle egress packets from, and ingress packets to, corresponding VMs. In SDN environment 100, logical switches and logical DRs may be implemented in a distributed manner and can span multiple hosts. For example, logical switches that provide logical layer-2 connectivity, i.e., an overlay network, may be implemented collectively by virtual switches 115A-C and represented internally using forwarding tables 116A-C at respective virtual switches 115A-C. Forwarding tables 116A-C may each include entries that collectively implement the respective logical switches. Further, logical DRs that provide logical layer-3 connectivity may be implemented collectively by DR instances 117A-C and represented internally using routing tables 118A-C at respective DR instances 117A-C. Routing tables 118A-C may each include entries that collectively implement the respective logical DRs.

Packets may be received from, or sent to, each VM via an associated logical port. For example, logical switch ports 161-166 (see "LP1" to "LP6") are associated with respective VMs 131-136. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 115A-C in FIG. 1, whereas a "virtual switch" may refer generally to a software switch or software implementation of a physical switch. In practice, there is usually a one-to-one mapping between a logical port on a logical switch and a virtual port on virtual switch 115A/115B/115C. However, the mapping may change in some scenarios, such as when the logical port is mapped to a different virtual port on a different virtual switch after migration of a corresponding virtualized computing instance (e.g., when the source host and destination host do not have a distributed virtual switch spanning them).

To protect VMs 131-136 against security threats caused by unwanted packets, hypervisors 114A-C may implement firewall engines to filter packets. For example, distributed firewall engines 171-176 (see "DFW1" to "DFW6") are configured to filter packets to, and from, respective VMs 131-136 according to firewall rules. In practice, network packets may be filtered according to firewall rules at any point along a datapath from a VM to corresponding physical NIC 124A/124B/124C. In one embodiment, a filter component (not shown) is incorporated into each VNIC 151-156 that enforces firewall rules that are associated with the endpoint corresponding to that VNIC and maintained by respective distributed firewall engines 171-176.

Through virtualization of networking services in SDN environment 100, logical networks (also referred to as overlay networks or logical overlay networks) may be provisioned, changed, stored, deleted and restored programmatically without having to reconfigure the underlying physical hardware architecture. A logical network may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts which may reside on different layer 2 physical networks.

SDN manager 180 and SDN controller 184 are example network management entities in SDN environment 100. One example of an SDN controller is the NSX controller component of VMware NSX® (available from VMware, Inc.) that operates on a central control plane. SDN controller 184 may be a member of a controller cluster (not shown for simplicity) that is configurable using SDN manager 180 operating on a management plane (MP). Network management entity 180/184 may be implemented using physical machine(s), VM(s), or both. Logical switches, logical routers, and logical overlay networks may be configured using SDN controller 184, SDN manager 180, etc. To send or receive control information, a local control plane (LCP) agent (not shown) on host 110A/110B/110C may interact with central control plane (CCP) module 186 at SDN controller 184 via control-plane channel 101A/101B/101C.

Hosts 110A-C may also maintain data-plane connectivity among themselves via physical network 104 to facilitate communication among VMs located on the same logical overlay network. Hypervisor 114A/114B/114C may implement a virtual tunnel endpoint (VTEP) (not shown) to encapsulate and decapsulate packets with an outer header (also known as a tunnel header) identifying the relevant logical overlay network (e.g., using a VXLAN or "virtual" network identifier (VNI) added to a header field). For example in FIG. 1, hypervisor-A 114A implements a first VTEP associated with (IP address=IP-A, MAC address=MAC-A, VTEP label=VTEP-A), hypervisor-B 114B implements a second VTEP with (IP-B, MAC-B, VTEP-B), hypervisor-C 114C implements a third VTEP with (IP-C, MAC-C, VTEP-C), etc. Encapsulated packets may be sent via an end-to-end, bi-directional communication path (known as a tunnel) between a pair of VTEPs over physical network 104.

In practice, traffic among of VMs 131-136 may be affected by various network issues in SDN environment 100. Conventionally, troubleshooting tools may be used to diagnose network issues affecting VMs 131-136. However, these tools usually necessitate users to have detected a network issue in SDN environment 100, as well as some idea as to where the network issue originates. For example, these tools may require a user to select two VMs or VNICs to visualize or test topology connectivity between two endpoints. When troubleshooting is required, a user might have to visit different appliances and familiarize with different troubleshooting tools to be able to debug network issues.

Self-Learning Packet Flow Monitoring

According to examples of the present disclosure, self-learning packet flow monitoring may be implemented to improve network troubleshooting and diagnosis. As SDN environment 100 increases in scale and complexity, any improvement in network troubleshooting and diagnosis may lead to reduced system downtime and better performance. As used herein, the term "self-learning" (also known as "continuous learning," "lifelong learning" and "incremental learning") may refer generally to technique(s) where a classification engine is modified or improved throughout its operation based on improved training data.

Figure 1:
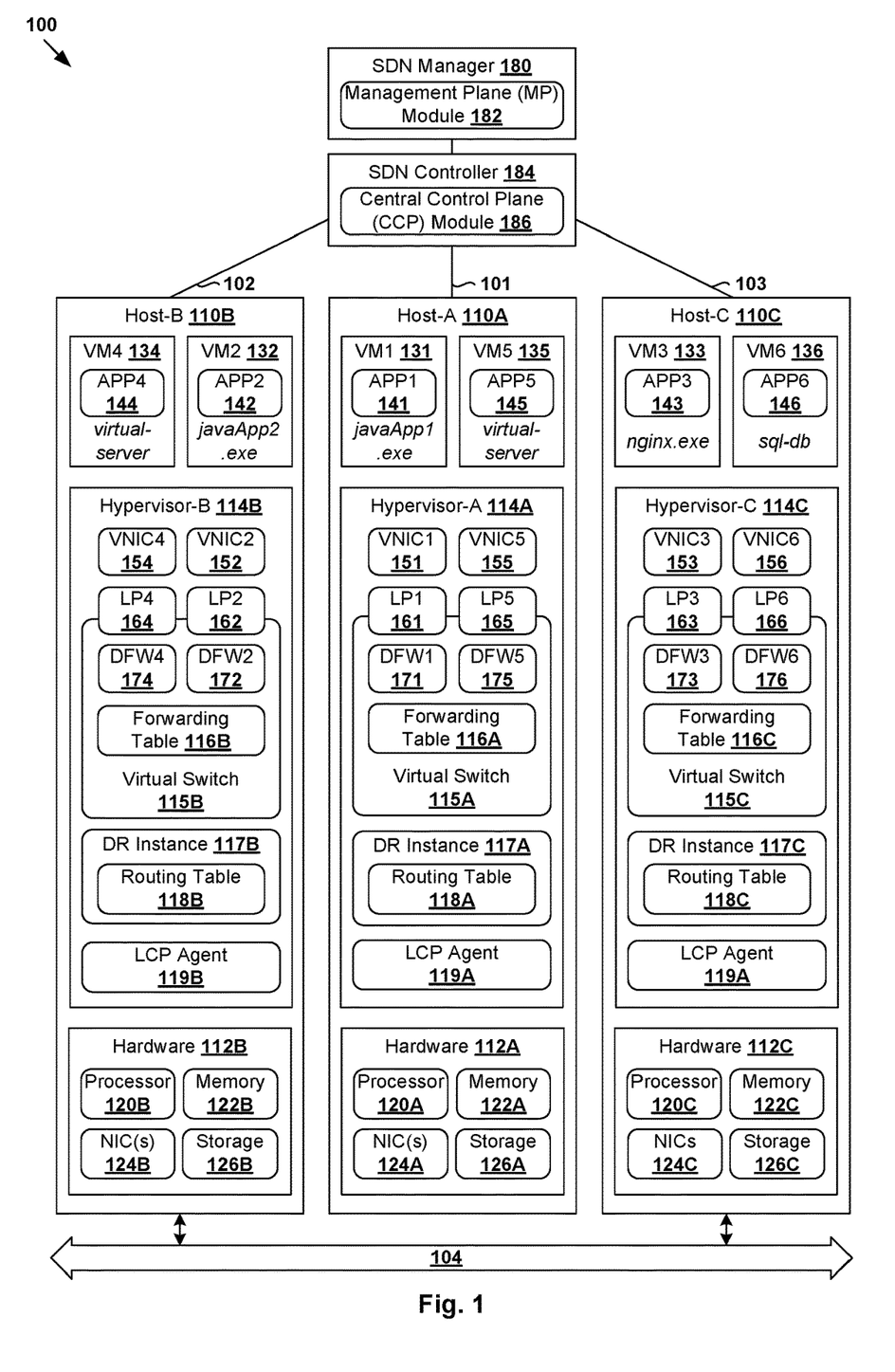
FIG. 1 is a schematic diagram illustrating an example software-defined networking (SDN) environment in which self-learning packet flow monitoring may be performed.
Figure 2:
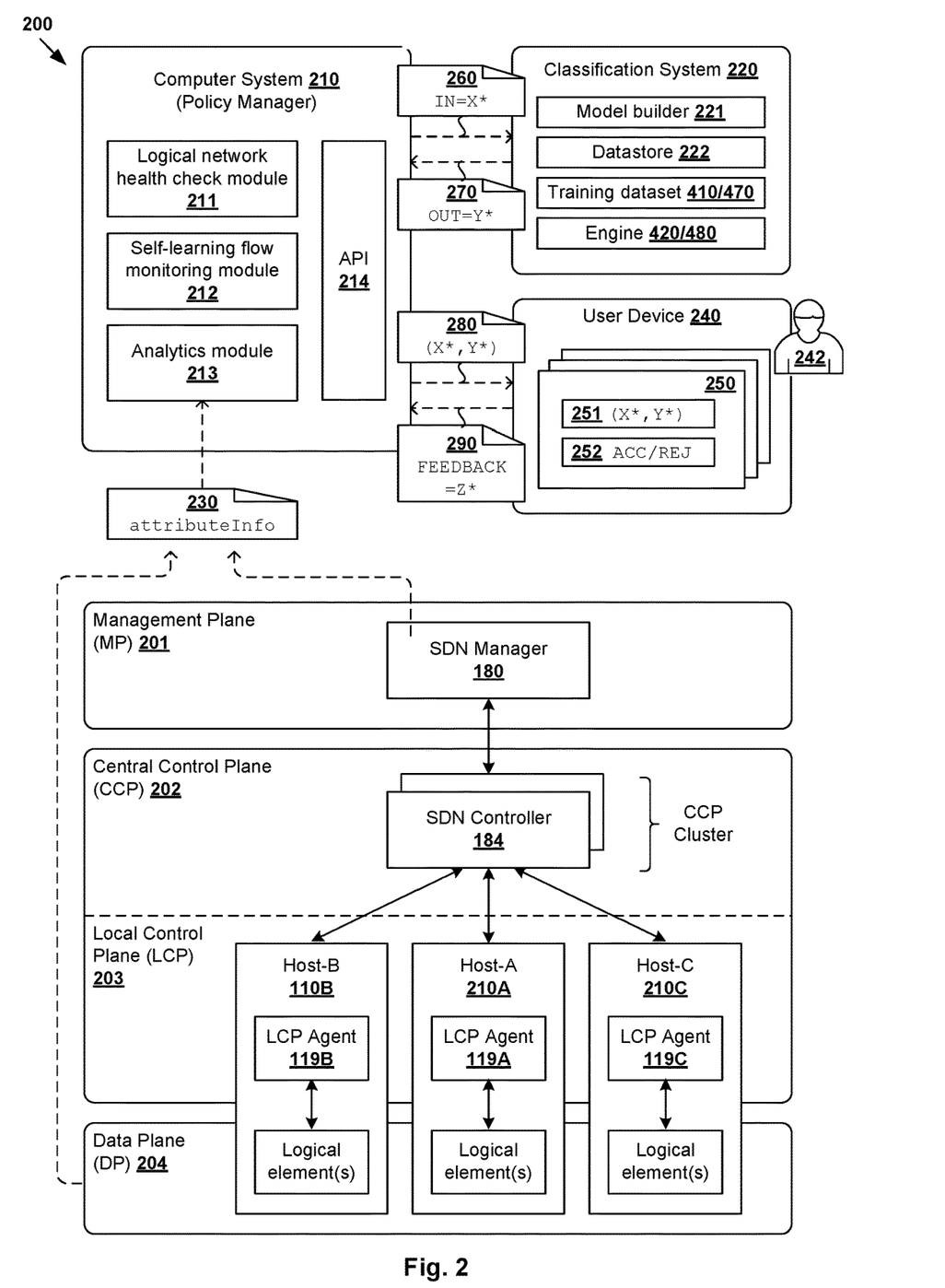
FIG. 2 is a schematic diagram illustrating an example system architecture for self-learning packet flow monitoring in an SDN environment.

In more detail, FIG. 2 is a schematic diagram illustrating example system architecture 200 for logical network health check in SDN environment 100 in FIG. 1. Depending on the desired implementation, example architecture 200 may include additional and/or alternative components than that shown in FIG. 2. Example architecture 200 may include policy manager 210 capable of interacting with various entities in SDN environment 100, such as SDN manager 180 (see MP 201), SDN controller 184 (see CCP 202), hosts 110A-C on LCP 203 and data plane (DP) 204 and user device(s) 240 operated by user(s) 242.

Policy manager 210 may represent a configuration layer that interacts with SDN manager 180 representing a realization layer in SDN environment 100. User(s) 242 operating with client device(s) 240 may interact with policy manager 210 to perform network configurations, which are then realized on hosts 110A-C via SDN manager 180. Any suitable UI may be supported by policy manager 210 using application programming interface (API) module 214, such as graphical user interface (GUI), command-line interface (CLI), representational state transfer (REST) API, etc.

Policy manager 210 may support any suitable module(s) to facilitate policy configuration as well as network troubleshooting and diagnosis. For example, policy manager 210 may include logical network health check module 211, self-learning packet flow monitoring module 212, analytics module 213 and API module 214. Policy manager 210 may be configured to monitor packet flows among VMs 131-136 periodically (e.g., every five minutes) using analytics module 213, which interacts with context engines (not shown) implemented by respective hosts 110A-C.

According to examples of the present disclosure, policy manager 210 ("computer system") may facilitate self-learning packet flow monitoring in SDN environment 100. An example will be explained using FIG. 3, which is a flowchart of example process 300 for a computer system to perform self-learning packet flow monitoring in SDN environment 100. Example process 300 may include one or more operations, functions, or actions illustrated by one or more blocks, such as 310 to 350. The various blocks may be combined into fewer blocks, divided into additional blocks, and/or eliminated depending on the desired implementation.

Figure 3:
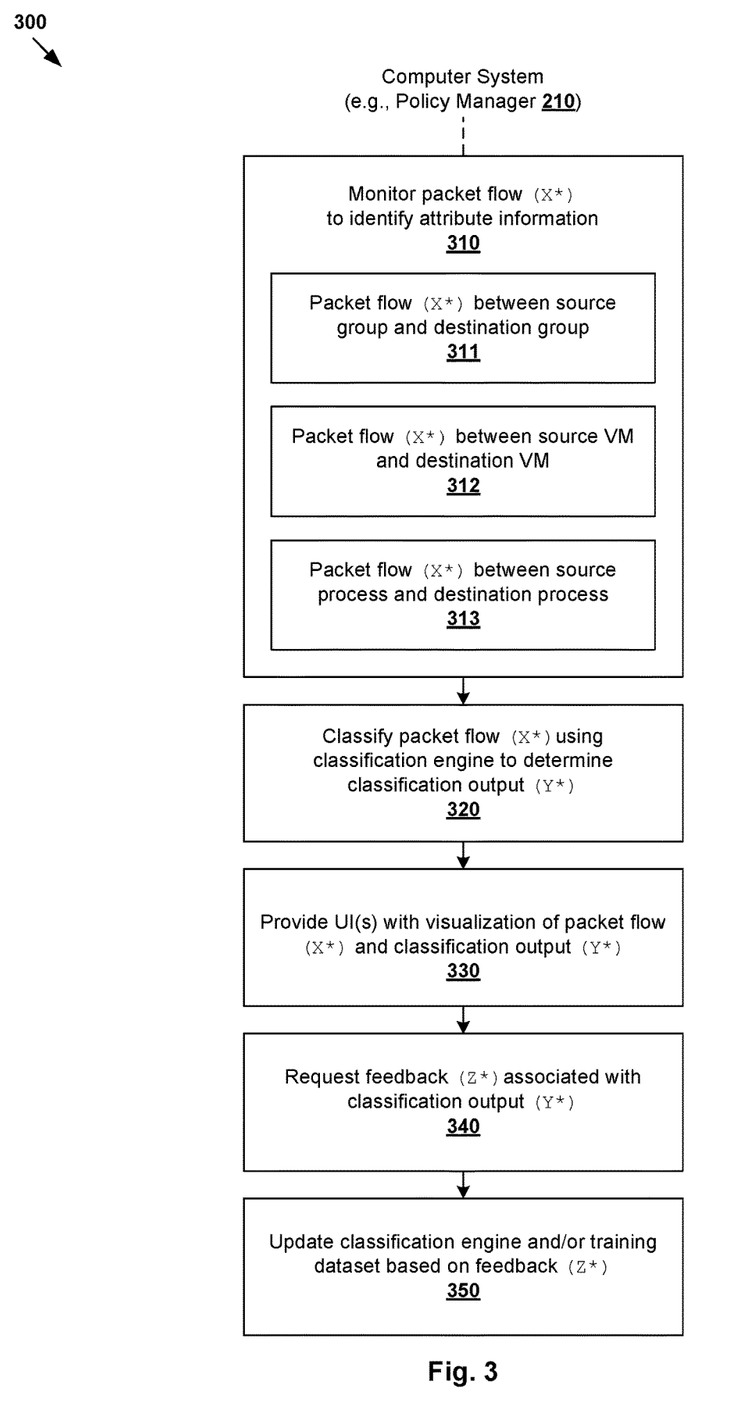
FIG. 3 is a flowchart of an example process for a computer system to perform self-learning packet flow monitoring in an SDN environment.

At 310 in FIG. 3, a packet flow (X*) may be monitored to identify attribute information associated with the packet flow (X*) between a source and a destination. Depending on the desired implementation, the packet flow (X*) may be between a pair of groups (see 311), VMs (see 312) or processes (see 313). In practice, a VM may represent an "object" in a group, and a process supported by the VM a "sub-object." The packet flow (X*) may be between (a) a source group, VM or process and (b) a destination group, VM or process. See 311-313 in FIG. 3.

At 320 in FIG. 3, based on the attribute information, the packet flow (X*) may be classified using classification engine 420 (see FIG. 4) that is trained using a training dataset to determine a classification output (Y*) associated with the packet flow (X*). At 330, a UI that includes a visualization of the packet flow (X*) and the classification output (Y*) may be provided to user device 240. Here, the term "provide" may refer generally to generating and sending any suitable information to cause user device 240 to render UI(s) on a display screen. At 340 and 350, a feedback (Z*) associated with the classification output (Y*) may be requested to update classification engine 420 and/or training dataset 410 shown in FIG. 2.

In the example in FIG. 2, policy manager 210 may obtain attribute information 230 associated with packet flows from SDN manager 180 and/or hosts 110A-C. The term "obtain" may refer generally to receiving or retrieving information from a source or datastore in which the information is stored. Next, policy manager 210 may request classification system 220 to classify a packet flow (X*) to determine a classification output (Y*) indicating whether the packet flow is suspicious or otherwise (i.e., good). User 242 operating user device 240 may interact with API module 214 of policy manager 210 to access UI 250 and provide a feedback (Z*), such as either accepting or rejecting the classification output (Y*). Example UI 250 specifies a visualization 251 of (X*, Y*) along with UI element 252 to request for feedback (Z*). See corresponding 260, 270, 280 and 290 in FIG. 2.

Figure 4:
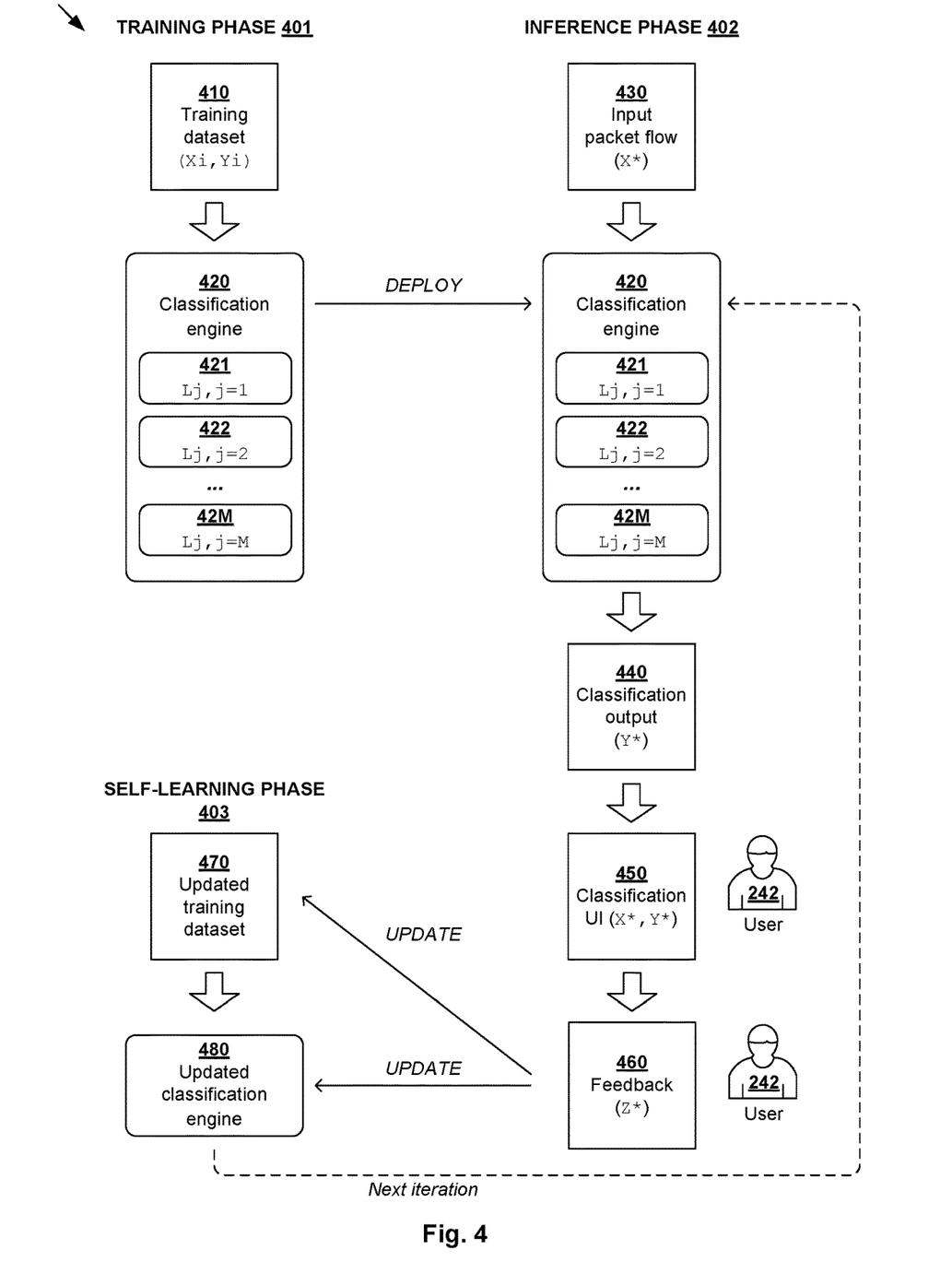
FIG. 4 is a schematic diagram illustrating example detailed process for self-learning packet flow monitoring in an SDN environment.

Using examples of the present disclosure, a self-adaptive and self-learning approach may be implemented to detect traffic anomalies in SDN environment 100 in a more efficient manner with respect to feedback and supervision by user 242 (e.g., network administrator). In practice, classification engine 420 may be trained using training dataset 410 that utilizes a combination of historical information, configuration information (e.g., flow tuple information) and user's feedback.

Training Phase

Figure 5:
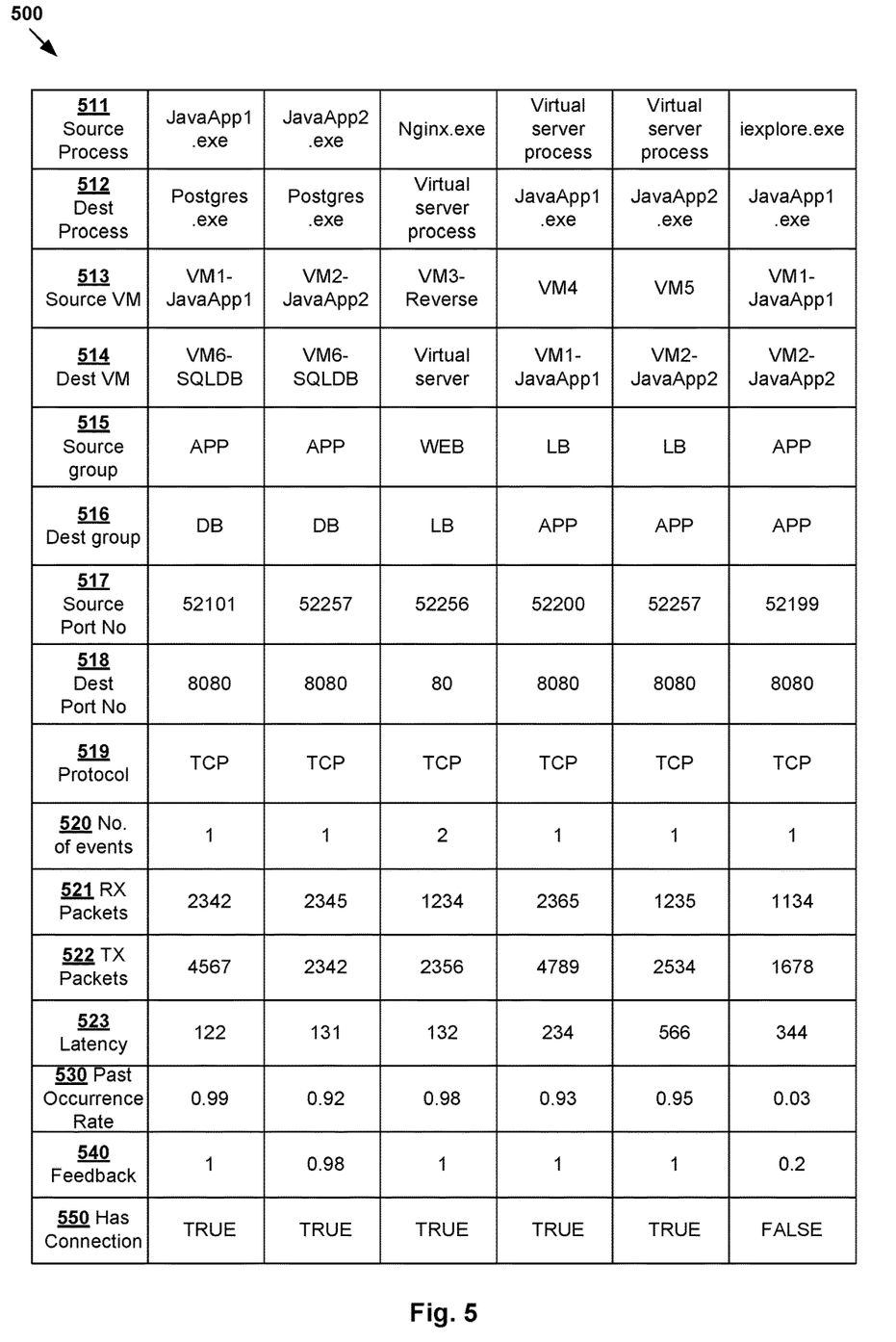
FIG. 5 is a schematic diagram illustrating an example training dataset for training a classification engine to facilitate self-learning packet flow monitoring.

FIG. 4 is a schematic diagram of example detailed process 400 of self-learning packet flow monitoring in SDN environment 100. Example process 400 may include one or more operations, functions, data blocks or actions illustrated at 410 to 480. The various operations, functions or actions may be combined into fewer blocks, divided into additional blocks, and/or eliminated depending on the desired implementation. Example process 400 may be performed by any suitable computer systems, such as policy manager 210, classification system 220, etc. The example in FIG. 4 will be discussed using FIG. 5, which is a schematic diagram illustrating training dataset 410 for training classification engine 420 to facilitate self-learning packet flow monitoring.

During training phase 401, classification engine 420 may be trained to map training input=packet flow (denoted as $X_i$, i=1, . . . , N) to corresponding training output=classification output ($Y_i$). Classification engine 420 may include multiple (M>1) classification blocks or layers 421-42M that are each associated with a set of weights. In this case, training phase 401 may involve finding weights that minimize a training error between training input ($X_i$) and classification result predicted by classification engine 420. The training process may be guided by estimating losses associated with the classification error. A loss function may be mean squared error between true and predicted outcome, but the loss function could have more complex formulas.

Training dataset 410 may be generated based on flow attribute information collected using analytics module 213 to interact with SDN manager 180 and hosts 110A-C. In practice, analytics module 213 may implement any suitable service, such as VMware NSX® Intelligence™ to gain insights into packet flows in SDN environment 100, etc. In the example in FIG. 5, training dataset 410 may include any suitable attribute information associated with each packet flow ($X_i$), such as source information (e.g., source process, VM and group), destination information (e.g., destination process, VM and group), protocol and port number information (e.g., TCP 8080, TCP 80), etc. Training dataset 410 may further include flow metric information associated with each packet flow ($X_i$), such as number of events (e.g., traffic between VMs), number of packets transmitted (TX) and/or received (RX), latency, throughput, packet loss, packet size, jitter, amount of TX and/or RX data (bytes), any combination thereof, etc. See 511-519 and 521-524 in FIG. 5.

In practice, latency may refer generally to the time required to transmit a packet belonging to the flow from a sender to a recipient, such as round-trip time (RTT), one-way latency, etc. Throughput may refer generally to the amount of data being sent from the sender to the recipient, such as the quantity of data per unit of time. Packet loss may refer generally to the number of packets lost per a fixed number (e.g., 100) of packets sent. Jitter may refer generally to a variance in latency over time. The number of packets transmitted or received may be used to calculate a packet drop rate between a pair of checkpoints.

In one example, classification engine 420 may be a rule-based decision tree that includes classification layers (denoted as $L_j$, where j=1, . . . , M) specifying a set of classification rules. Each rule may involve testing whether a condition is true, such as whether the source and destination belong to the same group, whether all other VMs in a source group has connections with a destination group, whether a source (process, VM or group) or a destination (process, VM or group) has a matching keyword or attribute, whether flow metric information (e.g., latency) satisfies a threshold, etc. Some example classification layers for a decision tree will be discussed further below.

In another example, classification engine 420 may be an artificial intelligence engine, such as a neural network, etc. In practice, a neural network is generally formed using a network of processing elements (called "neurons," "nodes," etc.) that are interconnected via connections (called "synapses," "weights," etc.). For example, a convolutional neural network may include multiple classification layers ($L_j$) that include a convolutional layer, pooling layer, rectified linear units (ReLU) layer, fully connected layer, loss layer, etc. These layers may be trained from end-to-end (e.g., from an input layer to an output layer) to extract feature(s) from an input packet flow and classify the feature(s) to produce a classification output.

Depending on the desired implementation, classification engine 420 may be trained using any suitable machine learning service. The service may be responsible for training the desired classification model, as well as performing classification on a set of test data for validation. Using training dataset 410, a full mesh of all possible connections between each pair of source and destination may be considered during training phase 401. When a new set of training data is discovered, it may be sent to storage on classification system 220 to update the model (i.e., engine 420).

Using training dataset 410, classification engine 420 may be trained to process historical information associated with packet flows during classification, such as whether traffic from one group to another group has been observed before, etc. If not, it is more likely that the packet flows are suspicious. Classification engine 420 may also be trained to process group membership associated with VMs. For example, if members of group=APP are communicating with members of group=DB with the exception of one packet flow, the missing communication may be classified to be suspicious. Further, if two VMs in the same group are communicating, the packet flow may be classified to be suspicious.

Inference Phase

During inference phase 402, policy manager 210 may perform self-learning packet flow monitoring using classification system 220. This may involve policy manager 210 generating and sending a request to classification system 220 to classify packet flow(s). The request may be initiated by policy manager 210, or user 242 by interacting with API module 214 supported by policy manager 210 via user device 240. For a particular input=packet flow 430 (X*), classification engine 420 may determine classification output 440 (Y*) by processing attribute information (see FIG. 5) associated with the packet flow using classification layers 421-42M.

Using the example in FIG. 1, input packet flow 430 (X*) may originate from source process=nginx.exe (see 143) supported by source VM3 133 that belongs to source group=WEB. Input packet flow 430 (X*) may be destined for destination process=sql-db (see 146) supported by VM6 136 that belongs to destination group=DB. Using a rule-based decision tree as an example, first classification layer ($L_1$) 421 may analyze flow attribute information to determine whether the source process=nginx.exe and destination process=sql-db belong to the same group.

Next, if output($L_1$)=false, second classification layer ($L_2$) 422 may determine whether any other member the source group has connectivity with the destination group. Further, if output($L_2$)=false, third classification layer ($L_3$) 423 may determine whether the source (e.g., process, VM or group) has a matching attribute (e.g., name contains keyword="java" or "app") and/or whether the destination (e.g., process, VM or group) has a matching attribute (e.g., name contains "dn," "postgre," "sql" or "mysql").

In one example, classification output 440 (Y*) may indicate whether input packet flow 430 (X*) is a "good" (e.g., Y*=1) or "suspicious" (e.g., Y*=0). In another example, a probabilistic classification output 440 (Y*) may be determined, where Y*∈[0,1]. Once completed, classification system 220 may send classification output 440 (Y*) to policy manager 210. Classification system 220 may be configured to integrate and store classification output 440 (Y*) on datastore 222, as well as sending classification output 440 (Y*) for presentation to user 242. Model builder 221 on classification system 220 may periodically update classification engine 420 to better adapt to the user's preferences.

Self-Learning Phase

Once classified, policy manager 210 may provide classification output 440 (Y*) associated with packet flow 430 (X*) to user 242 via API module 214 supported by policy manager 210. In particular, policy manager 210 may generate and send any suitable information to user device 240 to cause user device to display a visualization of each packet flow 430 (X*) and classification output 440 (Y*) between a pair of source and destination. To facilitate self-learning packet flow monitoring, classification UI 450 may include a UI element to request for classification feedback 460 (Z*) from user 242.

Here, the term "UI element" may be a window, visual representation (e.g., topology graph), button, menu, text box, list, application icon, title bar, status bar, size grip, toolbar, dropdown list, etc. Policy manager 210 may detect feedback 460 (Z*) based on any suitable UI event(s) generated by the user's interaction with user interface 450. The "UI event" may be captured in any suitable manager, such as using a keyboard to capture keyboard events (e.g. key press), mouse to capture mouse events (e.g. cursor position, key press) and touch screen to capture touch screen events, etc.

In response to detecting interactions of user 242 via UI 450, policy manager 210 may store classification feedback 460 (Z*) and refine classification system 220, thereby generating updated training dataset 470 and/or updated classification engine 480 accordingly. In the example in FIG. 5, a "past occurrence rate" (see 530) and/or connection endorsement rate (see 540) associated with a packet flow may be updated based on classification feedback 460 (Z*). As the quality of training dataset improves through user's feedback, the accuracy of classification system 220 should also improve to better adapt to the user's preferences.

Besides classification feedback 460 (Z*), self-learning phase 403 may be triggered by other events, such as configuration changes to create new packet flows or update existing packet flows, etc. This helps classification engine 420 to correlate any packet flow changes with configuration changes. The self-learning approach is also useful for mitigating the problem of small training sample size that might severely affect classification accuracy. Some example UIs will be discussed using FIGS. 6-8 below.

Example Classification Outputs

According to examples of the present disclosure, policy manager 210 may classify a set of packet flows in SDN environment 100 using classification engine 420 to obtain a set of classification outputs. This way, a full mesh of packet flows and associated classification outputs may be presented to user 242 for feedback (e.g., acceptance or rejection). UI(s) 250 may form part of a wizard for in-context, step-based for network troubleshooting and diagnosis in SDN environment 100.

Depending on the desired implementation, the term "in-context" may mean that the information provided is understandable from a high-level overview of SDN environment 100. This way, it is not necessary for user(s) 242 to apply different tools on different parts of SDN environment 100 for network troubleshooting and diagnosis. The "in-context" solution should be contrasted against conventional troubleshooting tools for inspecting a particular flow. If user 242 wishes to monitor the overall topology connectivity, the tools will have to be used between all pairs. For example, if there are 100 VMs, the debugging steps will have to be repeated for $C_2^{100}=4950$ times (i.e., possible 3-member combinations from a set of 100 VMs). Tools such as port connection is generally not considered to be "in-context" because it requires users to tear down the network topology and reconstruct the results to put an analysis together.

In practice, each packet flow in the set may be between a pair of groups, a pair of objects (e.g., VMs) or a pair of sub-objects (e.g., processes or applications). Other source-destination pairs may be considered, such as between a pair of pods (i.e., each pod being a group of containers), a pair of logical elements, etc. The term "logical element" or "logical forwarding element" may refer generally to a logical entity that is deployed on a datapath to connect a pair of endpoints (e.g., VM1 131 and VM6 136), such as a logical switch port, logical switch, logical router port, logical router, edge appliance, VNIC, etc.

(a) Group Communication View

Figure 6:
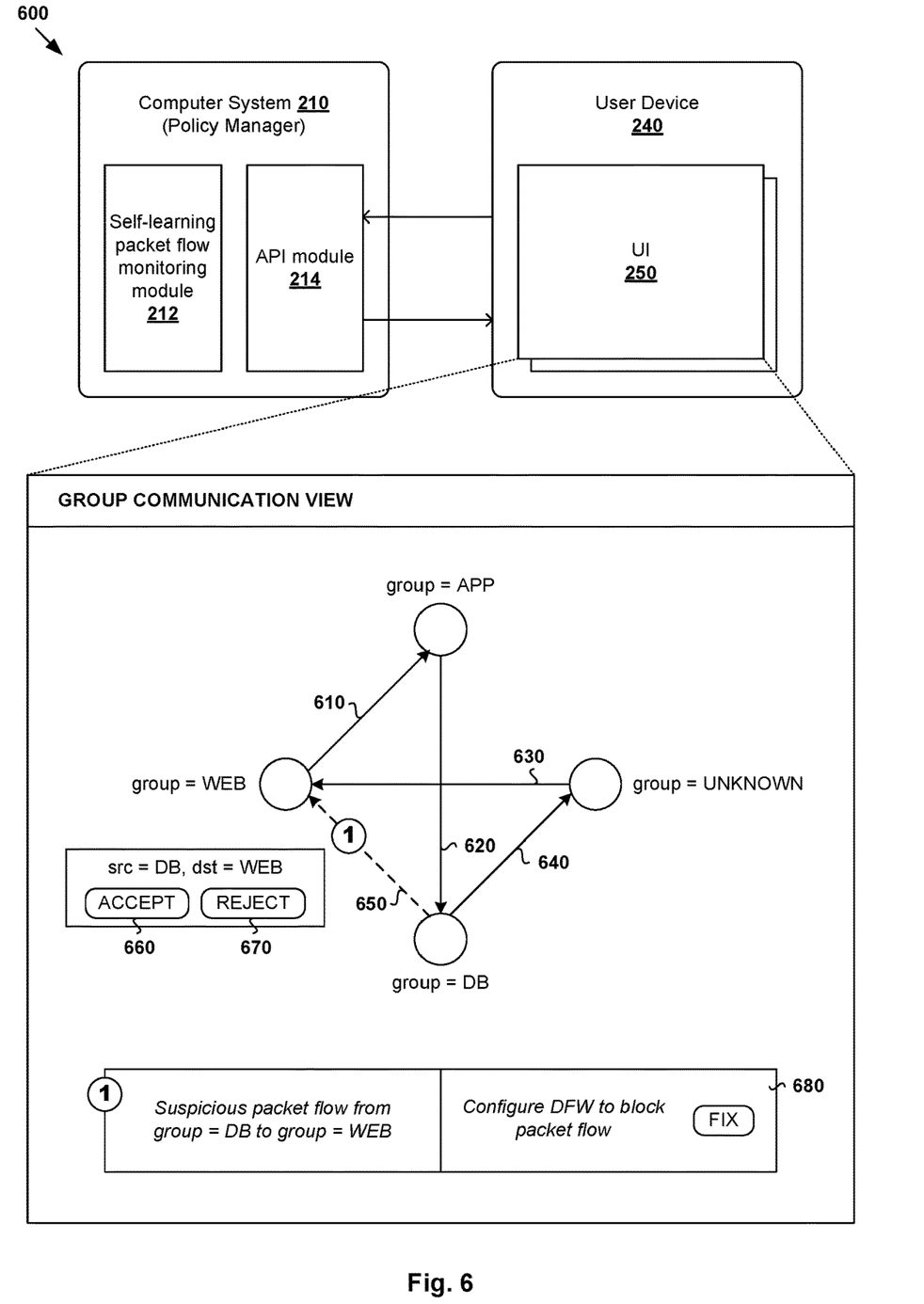
FIG. 6 is a schematic diagram illustrating an example self-learning packet flow monitoring for groups in an SDN environment.

FIG. 6 is a schematic diagram illustrating example self-learning packet flow monitoring 600 for groups in SDN environment 100. Here, group communications may be monitored and presented in the form of a mesh of packet flows among various groups. At 610, a first packet flow is between source group=WEB to destination group=APP. At 620, a second packet flow is between source group=APP to destination group=DB. At 630, a third packet flow is between source group=UNKNOWN to destination group=WEB. At 640, a fourth packet flow is between source group=UNKNOWN to destination group=DB. At 650, fifth packet flow is between source group=WEB to destination group=DB.

For particular packet flow 430 (X*), feedback 460 (Z*) may indicate whether user 242 accepts (i.e., endorses) or rejects associated classification output 440 (Y*). In the example in FIG. 6, fifth packet flow 650 is classified to be suspicious and highlighted. User 242 may disagree with the classification output and provide classification feedback 460 (Z*) by hovering over a UI element visualization of packet flow 430 (X*) and selecting whether to "ACCEPT" (see 660) or "REJECT" (see 670) the classification.

In practice, policy manager 210 may suggest a remediation action (see 680) in response to detecting a suspicious flow, such as by configuring a DFW rule to block the packet flow. This gives user 242 with the authority to mark a particular communication as good or suspicious in order to enrich training dataset 410 and improve classification accuracy in a self-learning and self-adaptive manner.

(b) VM Communication View

Figure 7:
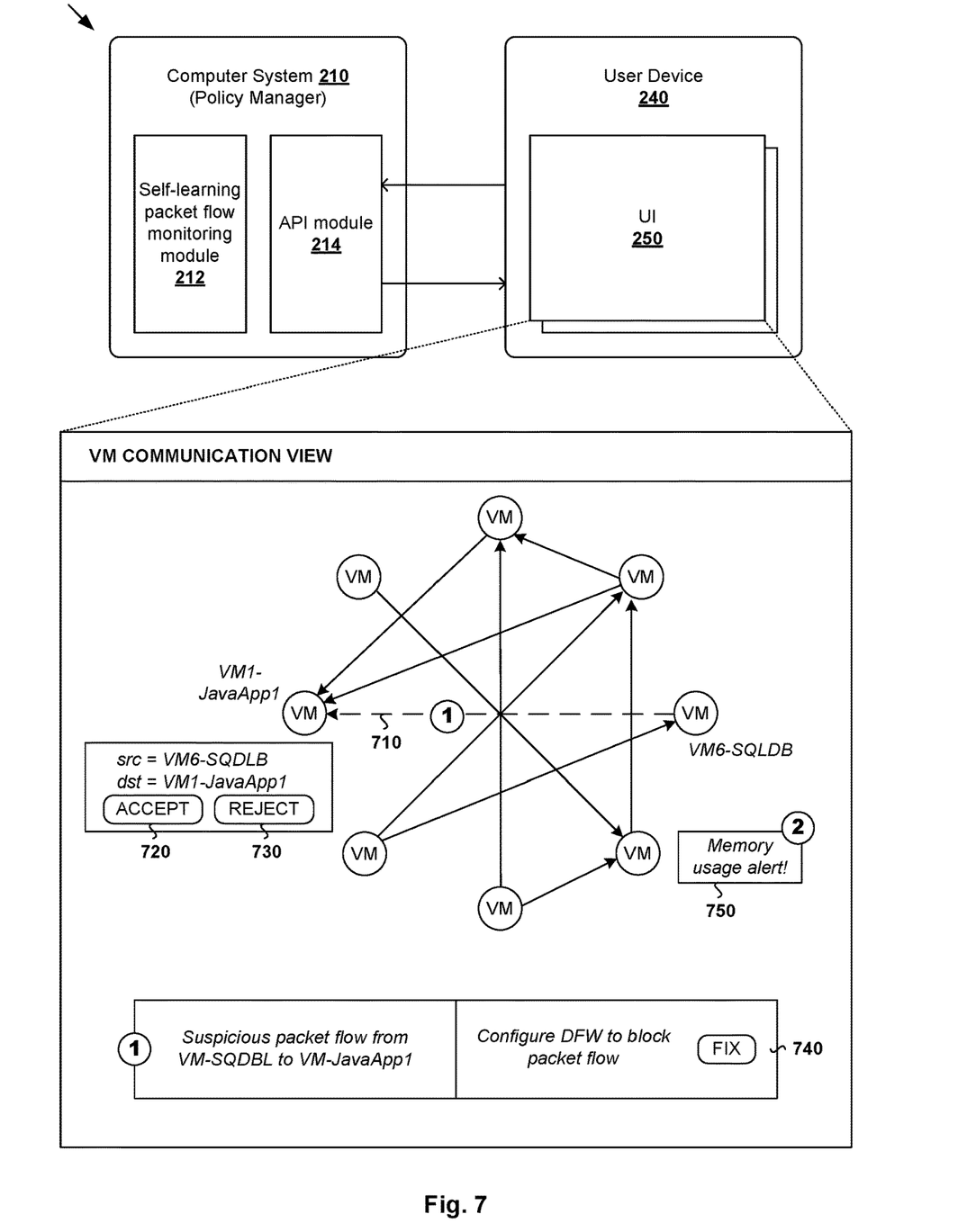
FIG. 7 is a schematic diagram illustrating an example self-learning packet flow monitoring for VMs in an SDN environment.

FIG. 7 is a schematic diagram illustrating example self-learning packet flow monitoring 700 for VMs 131-136 in SDN environment 100. Here, VM communications may be monitored and presented in the form of a mesh of packet flows among various VMs 131-136. First packet flow 710 is classified to be suspicious and highlighted. User 242 may provide classification feedback 460 (Z*) by hovering over a UI element visualization of packet flow 430 (X*) and selecting whether to "ACCEPT" (see 720) or "REJECT" (see 730) the classification. Policy manager 210 may also suggest a remediation action (see 740), such as by blocking the packet flow using a DFW rule.

Depending on the desired implementation, metric information (see 750) associated with VMs may be analyzed and highlighted if a threshold is exceeded. Any suitable performance metric information may be used, such as CPU utilization (e.g., per-process basis), memory utilization (e.g., per-process basis), number of packets transmitted (TX) and received (RX), amount of TX and RX data (bytes), applications (e.g., name, version, manufacturer) installed and/or running on VMs 131-136, any information collectable using VMs 131-136 (e.g., using guest OS), etc. The example in FIG. 7 may also be used to highlight any missing connection between a pair of VMs. Additionally, a connectivity check between a pair of VMs may be initiated.

(c) Process Communication View

Figure 8:
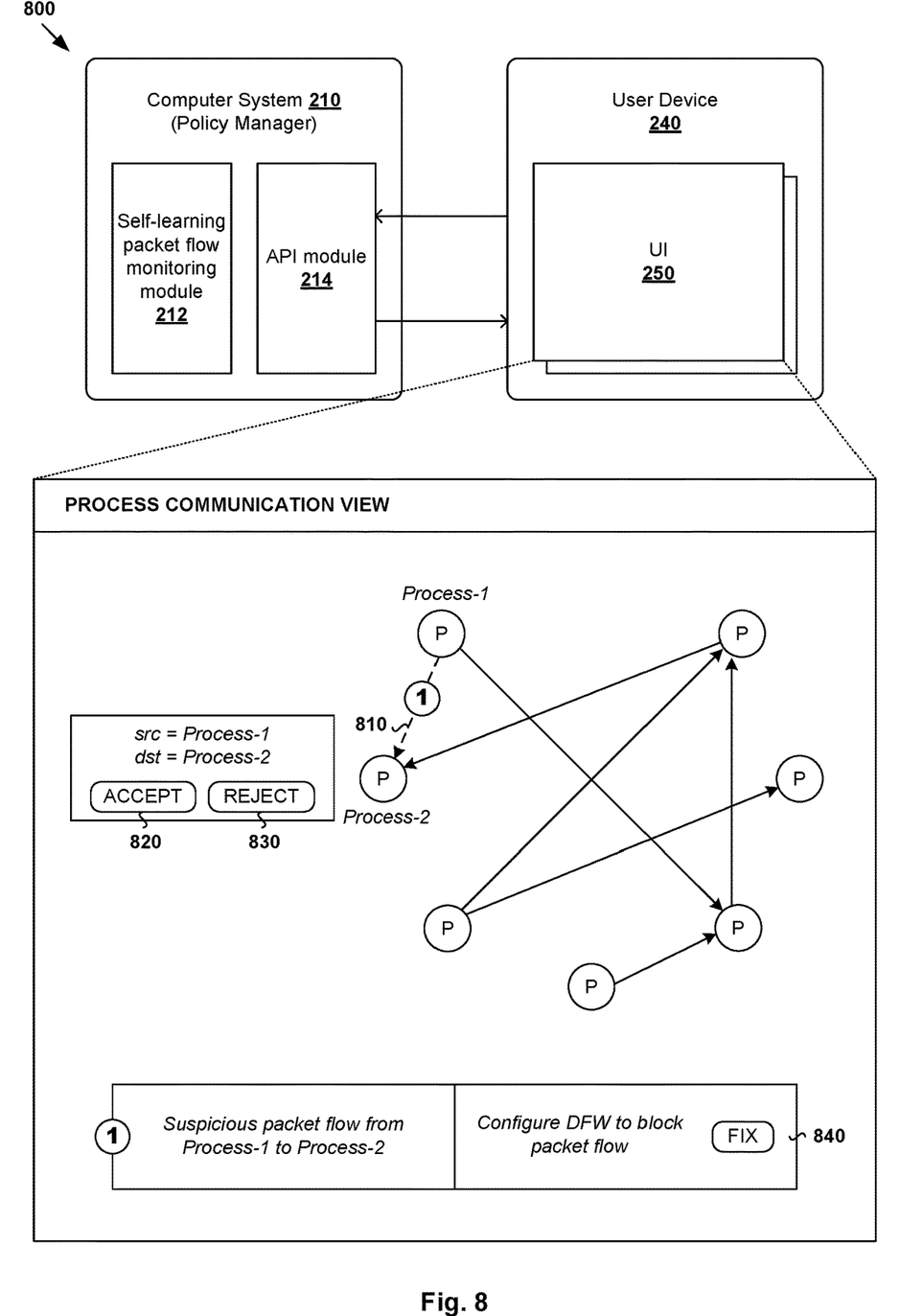
FIG. 8 is a schematic diagram illustrating an example self-learning packet flow monitoring for processes in an SDN environment.

FIG. 8 is a schematic diagram illustrating example self-learning packet flow monitoring 800 for processes 141-146 in SDN environment 100. Here, process communications may be monitored and presented in the form of a mesh of packet flows among various processes 141-146. First packet flow 810 is classified to be suspicious and highlighted. Similarly, user 242 may provide classification feedback 460 (Z*) by hovering over a UI element visualization of packet flow 430 (X*) and selecting whether to "ACCEPT" (see 820) or "REJECT" (see 830) the classification. Policy manager 210 may also suggest a remediation action (see 840), such as by blocking the packet flow using a DFW rule.

Container Implementation

Although explained using VMs 131-136, it should be understood that public cloud environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 8, container technologies may be used to run various containers inside respective VMs 131-136. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 8. For example, a computer system capable of acting as policy manager 210 or classification system 220 may be deployed in SDN environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a computer system to perform self-learning packet flow monitoring, wherein the method comprises:
    monitoring a packet flow to identify attribute information associated with the packet flow between a source virtualized computing instance and a destination virtualized computing instance;
    based on the attribute information, classifying the packet flow using a classification engine that is trained using a training dataset to determine a classification output associated with the packet flow;
    providing, to a user device, a user interface (UI) that includes a visualization of the packet flow and the classification output, wherein the visualization comprises a topology graph that graphically displays a visual representation of the source virtualized computing instance, the destination virtualized computing instance, and the packet flow between the source virtualized computing instance and the destination virtualized computing instance;
    requesting, via the UI, a feedback associated with the classification output for the packet flow, wherein the classification output indicates an issue with the packet flow;
    suggesting, via the UI, a remediation action to address the issue indicated by the classification output, wherein the suggested remediation action includes configuration of a distributed firewall (DFW) rule, implemented by a hypervisor, to block the packet flow; and
    based on the feedback from the user device, updating the classification engine or the training dataset.

2. The method of claim 1, wherein classifying the packet flow comprises:
    processing the attribute information using multiple layers of the classification engine to determine the classification output.

3. The method of claim 1, wherein classifying the packet flow comprises:
    determining the classification output to indicate whether the packet flow is suspicious or not suspicious based on the attribute information associated with the packet flow, wherein the packet flow between the source virtualized computing instance and the destination virtualized computing instance is between one or more of: the source virtualized computing instance and the destination virtualized computing instance, a source group that includes the source virtualized computing instance and a destination group that includes the destination virtualized computing instance, or a source process supported by the source virtualized computing instance and a destination process supported by the destination virtualized computing instance.

4. The method of claim 1, wherein providing the UI comprises:
provided the UI that includes the visualization of a mesh of multiple packet flows and multiple classification outputs for the respective multiple packet flows.

5. The method of claim 1, wherein requesting the feedback comprises:
providing, to the user device, a first UI element to request for an acceptance of the classification output or a second UI element to request for a rejection of the classification output, or both.

6. The method of claim 5, wherein updating the classification engine comprises:
in response to detecting the rejection of the classification output, updating the training dataset to include the packet flow, the classification output, and the rejection of the classification output.

7. The method of claim 1, further comprising:
training the classification engine using the training dataset that includes multiple training packet flows and respective multiple training outputs, wherein the classification engine is a rule-based decision tree or an artificial intelligence machine.

8. A non-transitory computer-readable storage medium that includes a set of instructions which, in response to execution by a processor of a computer system, cause the processor to perform a method of self-learning packet flow monitoring, wherein the method comprises:
monitoring a packet flow to identify attribute information associated with the packet flow between a source virtualized computing instance and a destination virtualized computing instance;
based on the attribute information, classifying the packet flow using a classification engine that is trained using a training dataset to determine a classification output associated with the packet flow;
providing, to a user device, a user interface (UI) that includes a visualization of the packet flow and the classification output, wherein the visualization comprises a topology graph that graphically displays a visual representation of the source virtualized computing instance, the destination virtualized computing instance, and the packet flow between the source virtualized computing instance and the destination virtualized computing instance;
requesting, via the UI, a feedback associated with the classification output for the packet flow, wherein the classification output indicates an issue with the packet flow;
suggesting, via the UI, a remediation action to address the issue indicated by the classification output, wherein the suggested remediation action includes configuration of a distributed firewall (DFW) rule, implemented by a hypervisor, to block the packet flow; and
based on the feedback from the user device, updating the classification engine or the training dataset.

9. The non-transitory computer-readable storage medium of claim 8, wherein classifying the packet flow comprises:
processing the attribute information using multiple layers of the classification engine to determine the classification output.

10. The non-transitory computer-readable storage medium of claim 8, wherein classifying the packet flow comprises:
determining the classification output to indicate whether the packet flow is suspicious or not suspicious based on the attribute information associated with the packet flow, wherein the packet flow between the source virtualized computing instance and the destination virtualized computing instance is between one or more of: the source virtualized computing instance and the destination virtualized computing instance, a source group that includes the source virtualized computing instance and a destination group that includes the destination virtualized computing instance, or a source process supported by the source virtualized computing instance and a destination process supported by the destination virtualized computing instance.

11. The non-transitory computer-readable storage medium of claim 8, wherein providing the UI comprises:
providing the UI that includes the visualization of a mesh of multiple packet flows and multiple classification outputs for the respective multiple packet flows.

12. The non-transitory computer-readable storage medium of claim 8, wherein requesting the feedback comprises:
providing, to the user device, a first UI element to request for an acceptance of the classification output or a second UI element to request for a rejection of the classification output, or both.

13. The non-transitory computer-readable storage medium of claim 12, wherein updating the classification engine comprises:
in response to detecting the rejection of the classification output, updating the training dataset to include the packet flow, the classification output, and the rejection of the classification output.

14. The non-transitory computer-readable storage medium of claim 8, wherein the method further comprises:
training the classification engine using the training dataset that includes multiple training packet flows and respective multiple training outputs, wherein the classification engine is a rule-based decision tree or an artificial intelligence machine.

15. A computer system, comprising:
a processor; and
a non-transitory computer-readable medium having stored thereon instructions that, in response to execution by the processor, cause the processor to:
monitor a packet flow to identify attribute information associated with the packet flow between a source virtualized computing instance and a destination virtualized computing instance;
based on the attribute information, classify the packet flow using a classification engine that is trained using a training dataset to determine a classification output associated with the packet flow;
provide, to a user device, a user interface (UI) that includes a visualization of the packet flow and the classification output, wherein the visualization comprises a topology graph that graphically displays a visual representation of the source virtualized computing instance, the destination virtualized computing instance, and the packet flow between the source virtualized computing instance and the destination virtualized computing instance;

request, via the UI, a feedback associated with the classification output for the packet flow, wherein the classification output indicates an issue with the packet flow;

suggest, via the UI, a remediation action to address the issue indicated by the classification output, wherein the suggested remediation action includes configuration of a distributed firewall (DFW) rule, implemented by a hypervisor, to block the packet flow; and based on the feedback from the user device, update the classification engine or the training dataset.

16. The computer system of claim 15, wherein the instructions that cause the processor to classify the packet flow cause the processor to:

process the attribute information using multiple layers of the classification engine to determine the classification output.

17. The computer system of claim 15, wherein the instructions that cause the processor to classify the packet flow cause the processor to:

determine the classification output to indicate whether the packet flow is suspicious or not suspicious based on the attribute information associated with the packet flow, wherein the packet flow between the source virtualized computing instance and the destination virtualized computing instance is between one or more of: the source virtualized computing instance and the destination virtualized computing instance, a source group that includes the source virtualized computing instance and a destination group that includes the destination virtualized computing instance, or a source process supported by the source virtualized computing instance and a destination process supported by the destination virtualized computing instance.

18. The computer system of claim 15, wherein the instructions that cause the processor to provide the UI cause the processor to:

provide the UI that includes the visualization of a mesh of multiple packet flows and multiple classification outputs for the respective multiple packet flows.

19. The computer system of claim 15, wherein the instructions that cause the processor to request the feedback cause the processor to:

provide, to the user device, a first UI element to request for an acceptance of the classification output or a second UI element to request for a rejection of the classification output, or both.

20. The computer system of claim 19, wherein the instructions that cause the processor to update the classification engine cause the processor to:

in response to detecting the rejection of the classification output, update the training dataset to include the packet flow, the classification output, and the rejection of the classification output.

21. The computer system of claim 15, wherein the instructions further cause the processor to:

train the classification engine using the training dataset that includes multiple training packet flows and respective multiple training outputs, wherein the classification engine is a rule-based decision tree or an artificial intelligence machine.

* * * * *